US009341527B2

(12) United States Patent
O'Bier, II et al.

(10) Patent No.: US 9,341,527 B2
(45) Date of Patent: May 17, 2016

(54) IMPACT DEFLECTION, ABSORPTION AND SENSING DEVICE AND SYSTEM

(71) Applicant: Church Hill Publishing, LLC, Henrico, VA (US)

(72) Inventors: Richard N. O'Bier, II, Henrico, VA (US); Russell E. Hubbard, Goldvein, VA (US)

(73) Assignee: Church Hill Publishing, LLC, Henrico, VA (US)

(*) Notice: Subject to any disclaimer, the term of this patent is extended or adjusted under 35 U.S.C. 154(b) by 110 days.

(21) Appl. No.: 14/263,129

(22) Filed: Apr. 28, 2014

(65) Prior Publication Data

US 2015/0285697 A1     Oct. 8, 2015

Related U.S. Application Data

(60) Provisional application No. 61/817,042, filed on Apr. 29, 2013.

(51) Int. Cl.
| | |
|---|---|
| *G01M 7/00* | (2006.01) |
| *G01L 5/00* | (2006.01) |
| *G01M 17/007* | (2006.01) |
| *A42B 3/04* | (2006.01) |
| *A63B 71/00* | (2006.01) |
| *F41H 1/02* | (2006.01) |
| *F41H 5/04* | (2006.01) |
| *F42D 5/045* | (2006.01) |
| *G01L 1/06* | (2006.01) |

(Continued)

(52) U.S. Cl.
CPC ............... *G01L 5/0052* (2013.01); *A42B 3/046* (2013.01); *A63B 71/00* (2013.01); *F41H 1/02* (2013.01); *F41H 5/0492* (2013.01); *F42D 5/045* (2013.01); *G01M 17/0078* (2013.01); *A41D 31/0005* (2013.01); *F41H 1/04* (2013.01); *G01L 1/06* (2013.01)

(58) Field of Classification Search
CPC ............ G01M 17/0078; G01M 17/078; G01L 5/0052; G01L 1/06; A41D 13/015
USPC ................ 73/11.04–11.09, 12.01–12.14
See application file for complete search history.

(56) References Cited

U.S. PATENT DOCUMENTS

| | | | | |
|---|---|---|---|---|
| 5,562,575 | A * | 10/1996 | Gvoich ................ | A63B 5/08 482/26 |
| 6,644,691 | B2 * | 11/2003 | Husain ................ | B60R 19/00 180/274 |
| 8,607,478 | B2 * | 12/2013 | Sokolowski .......... | A43B 5/12 36/113 |

(Continued)

*Primary Examiner* — Max Noori
(74) *Attorney, Agent, or Firm* — Landmark Intellectual Property Law, PLLC

(57) ABSTRACT

The present invention is directed to an impact absorption and detection system, including: one or more deflectable arch springs, having at least one leg with proximal and distal ends; and one or more bases, each of the proximal and distal ends attached to a base. Some embodiments may include: a plurality of arch spring assemblies, including: a deflectable arch spring having at least one leg with proximal and distal ends; one or more bases, each of the proximal and distal ends attached to a base; at least one sensor attached to the arch spring assembly; wherein the plurality of arch spring assemblies is configured in a chainmail arrangement and a base of one arch spring assembly is connected with a base of another arch spring assembly; a processor electrically connected to the sensors attached to the plurality of arch spring assemblies; and a data store in communication with the processor.

8 Claims, 22 Drawing Sheets

(51) Int. Cl.
*A41D 31/00* (2006.01)
*F41H 1/04* (2006.01)

(56) References Cited

U.S. PATENT DOCUMENTS

| | | | | |
|---|---|---|---|---|
| 9,004,242 B2* | 4/2015 | Hodgson | | F16F 7/12 |
| | | | | 188/266.7 |
| 2006/0254087 A1* | 11/2006 | Fechter | | A43B 13/141 |
| | | | | 36/27 |
| 2009/0058109 A1* | 3/2009 | Mattschull | | B60R 19/14 |
| | | | | 293/102 |
| 2010/0175330 A1* | 7/2010 | Turcot | | E04H 15/20 |
| | | | | 52/2.11 |
| 2011/0024707 A1* | 2/2011 | Williams | | E01F 15/0423 |
| | | | | 256/13.1 |
| 2012/0069324 A1* | 3/2012 | Ansari | | G01B 11/18 |
| | | | | 356/32 |
| 2012/0282041 A1* | 11/2012 | Breedlove | | E21D 11/22 |
| | | | | 405/288 |

* cited by examiner

IMPACT DEFLECTION, ABSORPTION AND SENSING DEVICE AND SYSTEM

RELATED APPLICATIONS

This application claims priority to U.S. Provisional Patent Application 61/817,042, filed on Apr. 29, 2013, which is incorporated herein by reference in its entirety.

BACKGROUND

Impact deflection and absorption are an on-going problem in our daily lives. From body armor for police and military personnel to impact sports and the average consumer driving their car, impact forces are an ever-present danger. Various materials and devices have been developed to provide limited protection against impacts with widely diverse results. Protection from these impacts, however, is only half the story. Detection of a single impact or multiple impacts is just as important. Being able to collect the impact data in real-time is critical in determining the severity of damage so that an action can be initiated to remedy the situation. The most prominent news in recent times has been the ever increasing awareness of head injuries in sports.

Concussion, or mild traumatic brain injury (MTBI), is the most common type of traumatic brain injury and one of the most common impact-related injuries that go undetected. Frequently defined as a head injury with a temporary loss of brain function, concussions can cause a variety of physical, cognitive, and emotional symptoms such as Post Traumatic Stress Disorder (PTSD). Sports-related concussions have increased over the years and this may be related to the increased physical stature of athletes and the intensity of contact sports over time. Military personnel also face increased concussive forces during times of war and/or conflicts due to Improvised Explosive Devices (IEDs) and the firing of large-round weaponry, such as rockets, artillery shells and so forth. Our elderly population, along with people needing long-term assistive care, also runs the risk of impact injuries due to falls.

It is desirable to record impacts, as well as their exact location in real-time. It is also desirable to actively respond and dissipate impact forces. Such aspects may be included in various products, from body armor and sports equipment to flooring and automotive components.

SUMMARY OF THE INVENTION

Aspects in accordance with some embodiments of the present invention may include an impact absorption and detection system, comprising: one or more deflectable arch springs, having at least one leg with proximal and distal ends; and one or more bases, each of the proximal and distal ends attached to a base.

Other aspects in accordance with some embodiments of the present invention may include: an impact absorption and detection system, comprising: a plurality of arch spring assemblies, comprising: a deflectable arch spring having at least one leg with proximal and distal ends; one or more bases, each of the proximal and distal ends attached to a base; at least one sensor attached to the arch spring assembly; wherein the plurality of arch spring assemblies is configured in a chainmail arrangement, wherein a base of one arch spring assembly is connected with a base of another arch spring assembly; a processor, the processor electrically connected to the sensors attached to the plurality of arch spring assemblies; and a data store, in communication with the processor.

Other aspects in accordance with some embodiments of the present invention may include an impact absorption and detection system disposed in a piece of body armor, comprising: a plurality of arch spring assemblies, comprising: a deflectable arch spring having at least one leg with proximal and distal ends; one or more bases, each of the proximal and distal ends attached to a base; at least one sensor attached to the base; wherein the plurality of arch spring assemblies is configured in a chainmail arrangement, wherein a base of one arch spring assembly is connected with a base of another arch spring assembly; a processor, the processor electrically connected to the sensors attached to the plurality of arch spring assemblies and configured to receive inputs from the one or more sensors indicating when an impact force has been received and determine, based on such inputs, the amount, location, and direction of force received; and a data store, in communication with the processor.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1A:
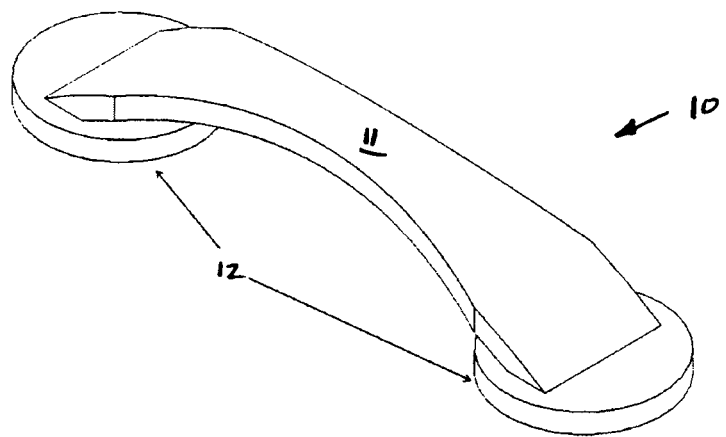
FIG. 1A shows an isometric view of an exemplary arch-spring device with foot pedestals in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, the present invention may provide systems and methods for the detection, collection, and an analysis of impact forces while dissipating these forces using passive and/or active methods. The system may be comprised of one or more spring elements, as well sensors and software configured as a modular system to absorb and deflect kinetic energy from an external impact force.

In general, systems in accordance with some embodiments of the present invention may be broken into two types: arch springs and swept springs. Each will be discussed in turn.

Arch Springs

Figure 1B:
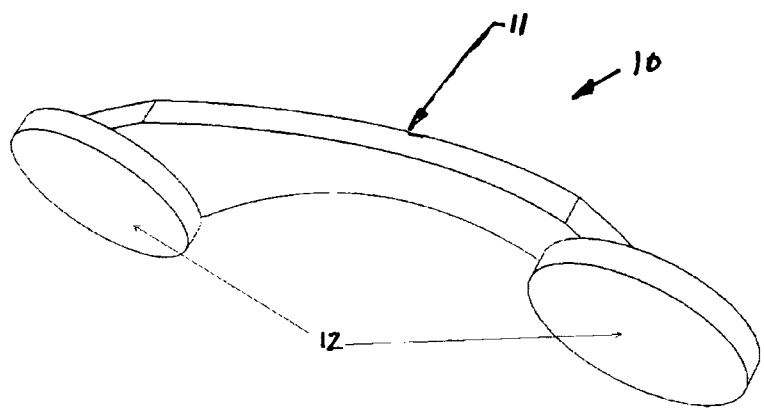
FIG. 1B illustrates a bottom isometric view of an exemplary arch-spring device with foot pedestals in accordance with some embodiments of the present invention.
Figure 1C:
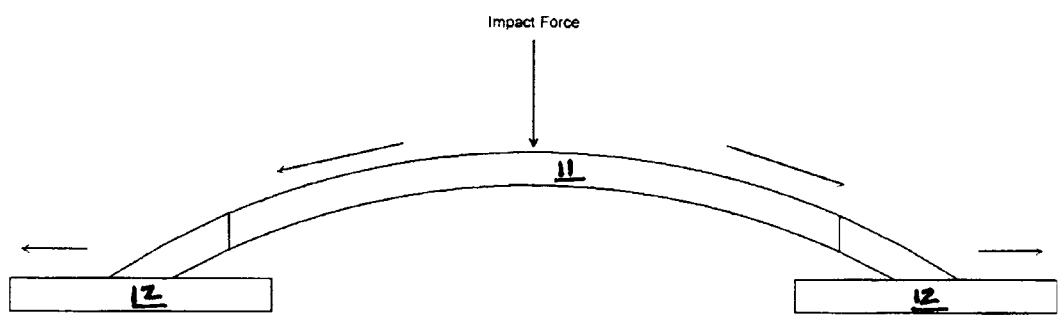
FIG. 1C depicts a side view of an exemplary arch-spring device with foot pedestals, in accordance with some embodiments of the present invention.

An arch spring may be a purely passive deflection and/or absorption device that may include sensor detection capabilities. An arch spring, as shown in 1A-1C may comprise an arch tapered towards pedestals, to allow for flexibility in the center of the arch. With reference to FIGS. 1A-1C an arch 10 may comprise a center portion 11 connected at both proximate and distal ends to a pedestal 12. Note that while FIGS. 1A-1C depicts the pedestal as being circular in nature, it is contemplated that the pedestal may take any shape conducive to the design application.

The pedestals 12 may be designed to provide a large surface area, so that various sensors and electrodes may be mounted thereon. For example, electroencephalography (EEG) sensors, and/or other physiological or environmental sensors may be placed thereon. The pedestals 12 may also provide a surface area such that one arch spring may be connected to a second arch spring as will be discussed below with regards to FIGS. 2A and 2B.

With reference to FIG. 1C it can be seen that an impact forces intended to be applied to the top of the arch 11. Such impact force may cause the pedestals 12 to move laterally away from the arch. In this manner, the impact force may be dissipated through the movement of the pedestals.

The arch spring 10 may be formed from any number of materials. It is contemplated that in accordance with some embodiments of the present invention the arch and pedestals may be integrally formed. For example, the arch and pedestals may be formed through injection molding. Simple materials may include acrylonitrile butadiene styrene (ABS), polyethylene tetraphthalate (PET) or co-polymers thereof, polypropylene or polypropylene copolymerized with ethylene, or polypropylene mixed with ethylene-propylene rubber (EPDM), nylon composites with carbon fiber, graphene, carbon nanotubes and other 2-D materials.

The specific size and dimensions of the arch spring may vary, depending upon the application and the amount of force expected to be exerted thereon. The specific dimensions and specific material may determine how much the arch may deflect under certain forces. For example, if the base of the arch is 9.5 mm wide, the center arch may be 4.76 mm wide and the overall arch length may be 41.275 mm. In such an embodiment, the diameter of the foot pedestal may be 12.7 mm, and the overall thickness for the entire device may be 1.587 mm such arrangements may allow for example the arch to be deformed by approximately 30% during impact. Again, note that such dimensions are exemplary only in the specific sizes of the arch may vary depending upon the materials and application.

Figure 2A:
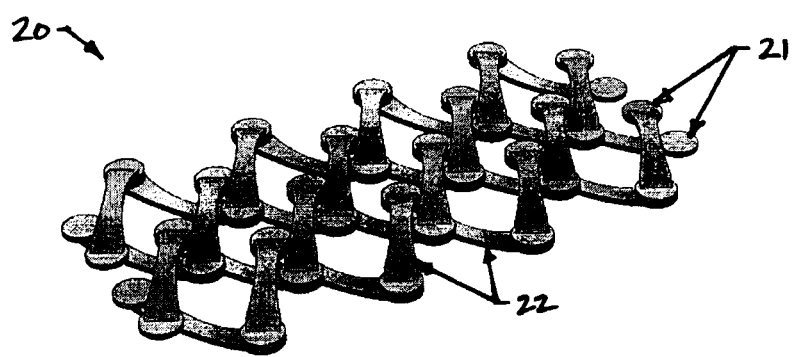
FIG. 2A shows an isometric view of a plurality of arch-spring devices in an exemplary chain-link configuration, in accordance with some embodiments of the present invention.
Figure 2B:
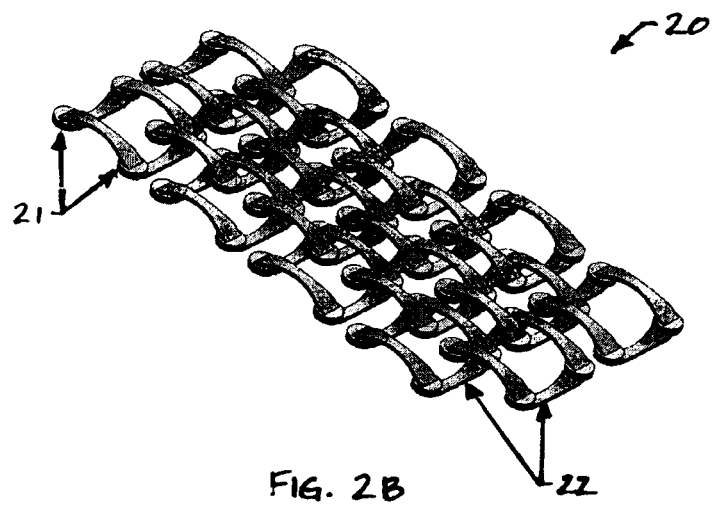
FIG. 2B shows an isometric view of a plurality of arch-spring devices in an exemplary chain-link configuration, in accordance with some embodiments of the present invention.

With reference to FIGS. 2A-2B, it can be seen that a plurality of arch springs may be assembled into a chain mail and/or chain link configuration. Such configurations may allow the system to be placed in a flat plane, such as a flooring system, door panel, or palace system. Alternatively, the same configuration may allow the system to be wrapped around an object such as body armor, and/or embedded between fabric layers of a compression suit.

With reference to FIG. 2A, chain mail 20 can be seen to comprise a plurality of arch springs. Arch Springs may include the arch 22 and pedestal base 21. Pedestal base 21 of one arch spring may be connected to pedestal base 21 of a second arch spring, and so on. Depending upon the specific application the arch spring chain mail may be configured in a tight pattern or wheeze, or may be spread apart. Note that in this embodiment the arch springs in a top layer may float over arch springs and a bottom layer in order to allow for some movement. This may allow for the device to wrap around an object without deforming the individual arch that is formed from the chain mail. This may be useful in applications such as a helmet liner, body armor, and or other non-planar application.

When the arch springs are configured in a chain mail and/or chain link configuration, it may be necessary to embed any sensors directly into the embodiment. For example a template mold may contain sensors and/or electrical parts along with all required wiring material for fabrication, for example ABS plastic, may be molded around the parts to complete a finished product. In such a manner, an entire configuration may be molded as one piece, thereby simplifying production and reducing costs.

When an impact force is received, longitudinal waves may be propagated across the surface area of the springs and the assembly. Mechanical longitudinal waves are also called compressional waves or compression waves, because they produce compression and rarefaction when traveling through a medium. In an elastic medium with rigidity, a harmonic pressure wave oscillation has the form, where $y(x,t)=y_0 \cos(kx-\omega t+\phi)$, where y is the amplitude of displacement, x is the distance along the axis of propagation, t is time, k is the wave number, and $\omega$ is the angular frequency, and $\phi$ is the phase difference. The restoring force, which acts to return the springs to original position is provided by the springs resistance to compression (i.e., its bulk modulus). Accordingly, the springs and assemblies may be configured to deflect or dissipate certain impact forces based upon the design of the springs (e.g., the material of manufacture, the number of springs in a specified area, etc.).

Swept Spring

Figure 3A:
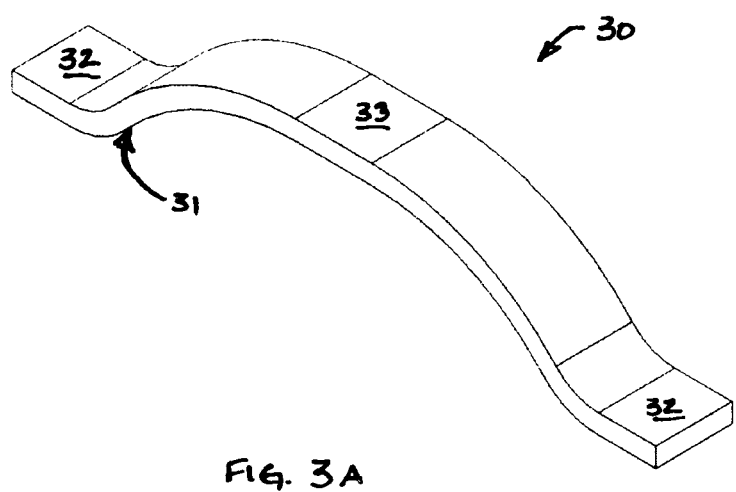
FIG. 3A illustrates an isometric view of an exemplary swept-spring, in accordance with some embodiments of the present invention.
Figure 3B:
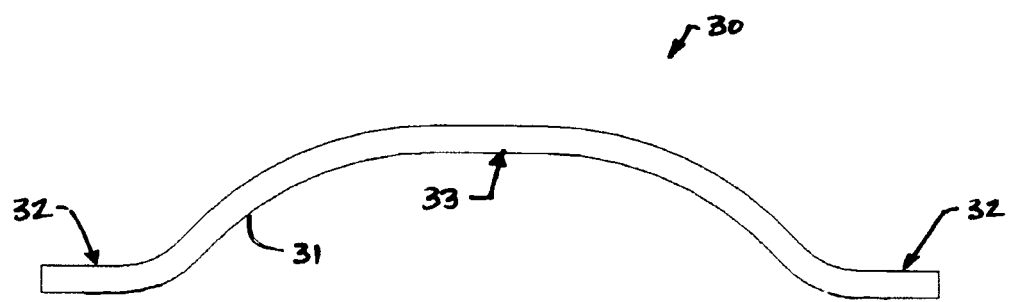
FIG. 3B shows a side view of an exemplary swept-spring, in accordance with some embodiments of the present invention.

With reference to FIGS. 3A and 3B, a swept with the two substantially flat proximate and distal ends 32. Arch 31 may also comprise a flat center section 33. Similar to the arch spring discussed above, the slips spring may absorb the impact force at the top of the arch, causing the proximate and distal ends of the arch to move laterally.

As will be discussed in greater detail below, in accordance with some embodiments of the present invention slept spring devices may be utilized as floating springs, which may allow for much greater lateral movement and therefore greater dissipation of energy.

The swept springs may be comprised of any number of materials including as noted above, acrylonitrile butadiene styrene (ABS), polyethylene tetraphthalate (PET) or copolymers thereof, polypropylene or polypropylene copolymerized with ethylene, or polypropylene mixed with ethylene-propylene rubber (EPDM), nylon composites with carbon fiber, graphene, carbon nanotubes and other 2-D materials. Moreover, it is anticipated in contemplated that arch spring may be comprised of other material such as graphing, 2-D material, and/or polymers to produce thermally and electrically conductive components. Other potential materials include, but are not limited to, memory metals, advanced ceramics, conductive plastics, conductive foam and non-Newtonian materials which in their raw state flow freely when moved slowly, but on shock, lock together to absorb and disperse energy. The most beneficial materials, however, may not be in one but rather a combination of several. As mentioned earlier, the use of epoxy resins mixed with fibers give us the best of toughness and durability while also allowing for the addition of other materials to handle conductivity, heat transference and noise dampening.

Figure 4A:
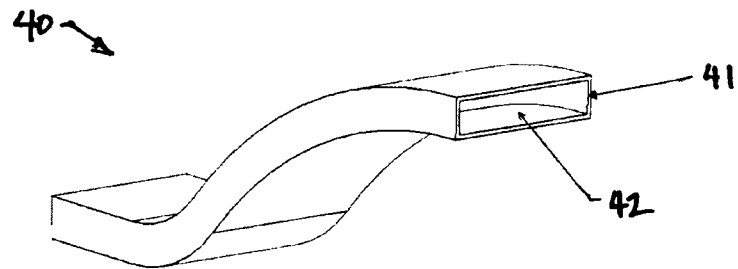
FIG. 4A depicts an exemplary cross-sectional view of a swept spring, in accordance with some embodiments of the present invention.
Figure 4B:
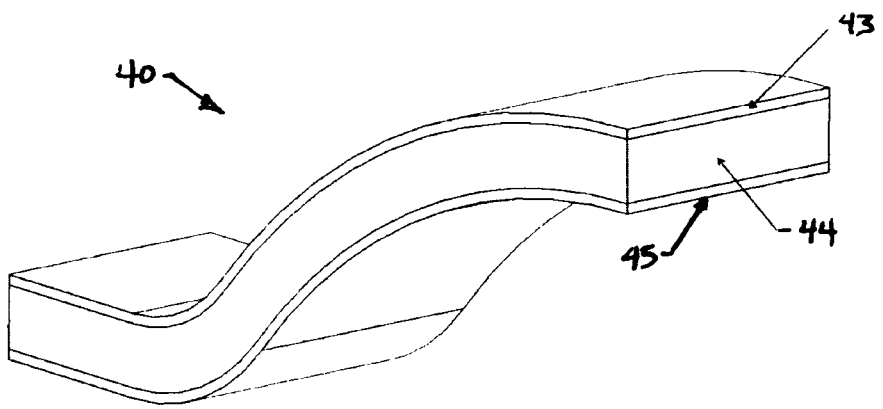
FIG. 4B depicts an exemplary cross-sectional view of a swept spring, in accordance with some embodiments of the present invention.

With reference to FIGS. 4A and 4B, it can be seen that swept spring may be comprised of any combination of materials. With reference to figure for a swept spring 40 may be formed of a square tubular structure 41, which may include hollow cavity 42. These two components 41, 42 may each be used for various purposes. For example, external component 41 may provide electrical conductivity between and amongst various sensors and/or processors. Material that may be placed in cavity 42 may be used to provide structural support and/or to mechanically resist impact forces. Similarly, the selection of material may provide for different properties of the swept spring at various temperatures. Alternatively, swept spring 40 may be left with an empty cavity 42. Cavity 42 may be filled with any number of materials that may provide for specific tuning of flexibility and/or stiffness, as well as conductive properties.

As noted above with regard to the arch spring, the slept spring may have any shape and/or size that is suitable for its application. For example, a swept spring and pedestal bases may have a thickness of approximately 1.587 mm, and an overall length are meant to end of approximately 53.59 mm. With such a configuration, the overall width may be 6.35 mm. For swept springs with a hollow center, it is anticipated that the thickness of the outer portion may be approximately 0.16 mm. However a wide range of sizes, including up to feet in length and width, may allow the assembly to be configured for specific applications.

With reference to FIG. 4B, rather than having a separate hollow cavity in the center of the spring material, the swept spring 40 may be comprised of at least three portions 43, 44, 45 sandwiched together. The three portions may be comprised of various materials in order to imbue the swept spring 40 with various physical, mechanical, electrical, and/or thermal, characteristics.

Figure 5:
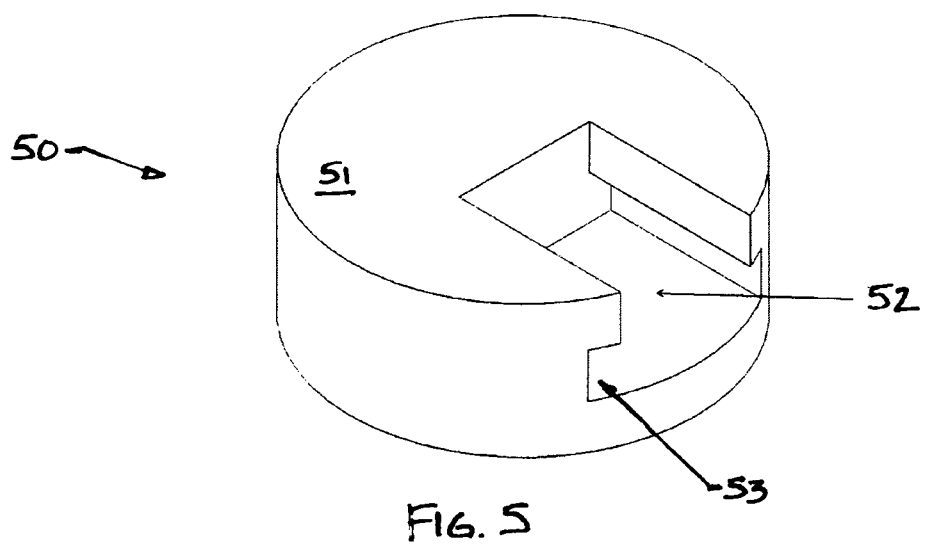
FIG. 5 illustrates an isometric view of an exemplary foot pedestal in accordance with some embodiments of the present invention.

With reference to FIG. 5, a pedestal base 50 that may be used with a swept spring will now be discussed. Pedestal base 50 may be comprised of a base portion 51, which may be of any shape or size. With reference to FIG. 5, base portion 51 may have a substantially round disc like shape that may have a slot 52 cut into it. Slot 52, may include a larger area 53 that may be keyed to accept the swept spring. The dimensions of the slot may be sufficient to allow movement of the swept spring during impact force, but to otherwise maintain sufficient rigidity of the overall assembly. It is contemplated that the base portion 51 may include an embedded sensor, such as a touch sensor or proximity sensor, which may determine the location of the end of the swept spring. In accordance with some embodiments of the present invention, the base portion 51 may also include a plug into which the swept spring may be inserted, which may provide both physical connection and electric connection.

Note that in accordance with some embodiments of the present invention, pedestal 50 may further comprise a hollow cavity that may be designed to a, a multiple sensors. For example, physiological sensors for the detection of heart-rate, breathing-rate, temperature, and the EEG sensors for detecting brain wave activity may be disposed within the cavity.

Figure 6A:
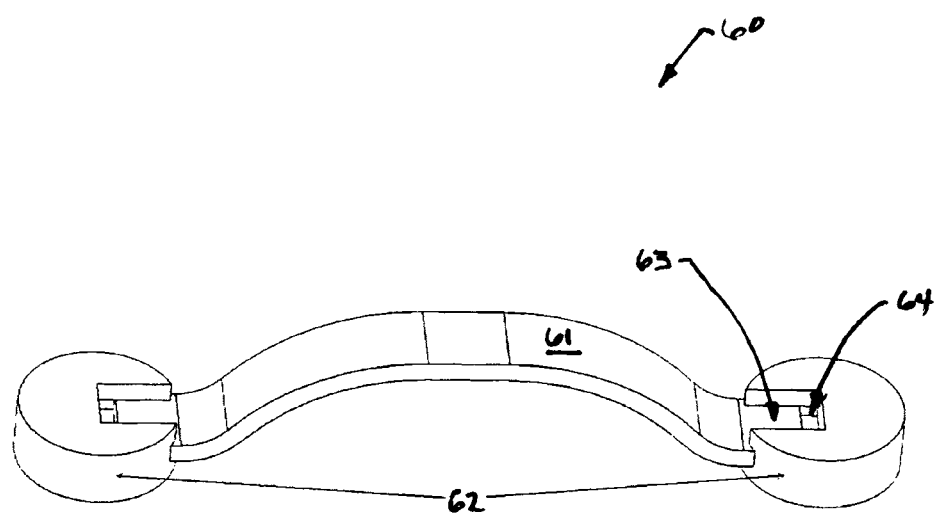
FIG. 6A depicts an isometric view of an exemplary assembled swept-spring, in accordance with some embodiments of the present invention.
Figure 6B:
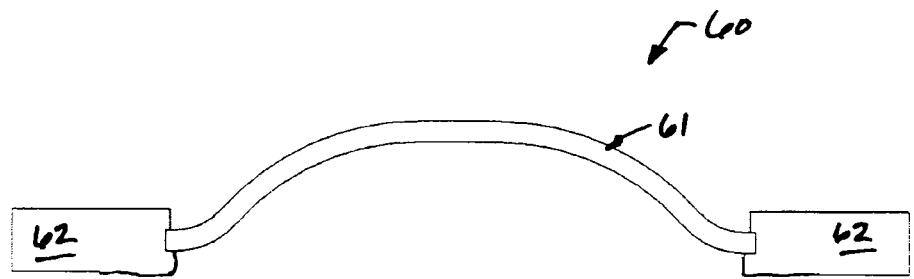
FIG. 6B shows a side view of an exemplary fully assembled swept-spring, in accordance with some embodiments of the present invention.

With reference to FIGS. 6A and 6B, an assembly 60 of a swept spring with two pedestals will now be discussed. Assembly 60 may generally comprise a swept spring 61 and two pedestals 62. Slept spring 61 may comprise proximate and distal substantially flat portions 63 which may be inserted into slots and pedestal 62. Note that upon insertion a gap 64 may still remain between the end of the swept spring and the pedestal. This may allow for lateral movement of the swept spring, upon receipt of impact force. Also note that in accordance with some embodiments of the present invention, various sensors may be positioned in the slot of the pedestal in order to determine and detect when the end of the swept spring is latterly moved upon application of force.

Figure 7A:
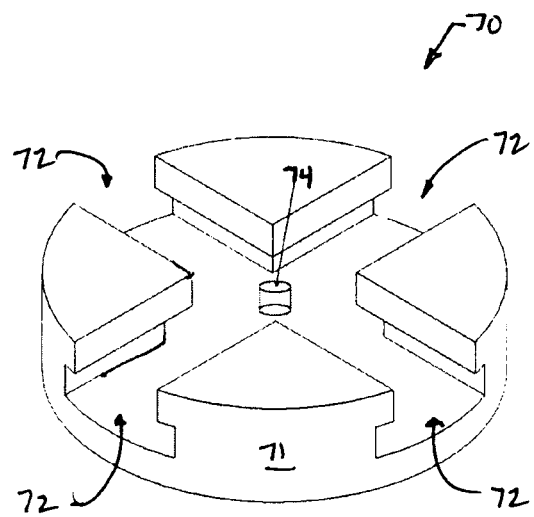
FIG. 7A shows an isometric view of an exemplary multi-notched foot pedestal, in accordance with some embodiments of the present invention.
Figure 7B:
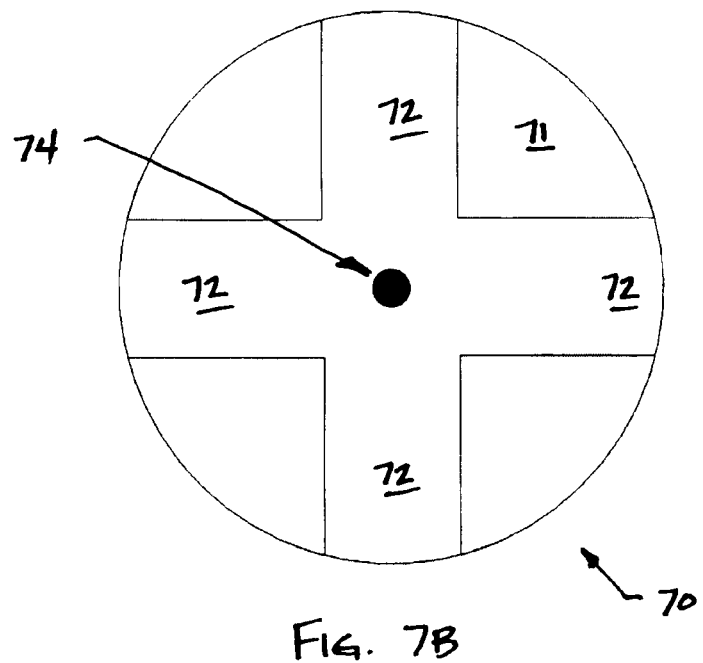
FIG. 7B depicts a top view of an exemplary multi-notched foot pedestal, in accordance with some embodiments of the present invention.

With reference to FIGS. 7A and 7B a four way pedestal base 70 will now be discussed. Pedestal base 70 may be comprised of a base material 71 and into which four (4) channels 72 may be disposed. Each of the four (4) channels 72 may be keyed to a specific slot size 73 in order to receive swept springs. In addition, pedestal base 70 may further comprise a single center sensor 74, which may be triggered upon lateral movement of any of the four assembled swept springs.

Figure 8A:
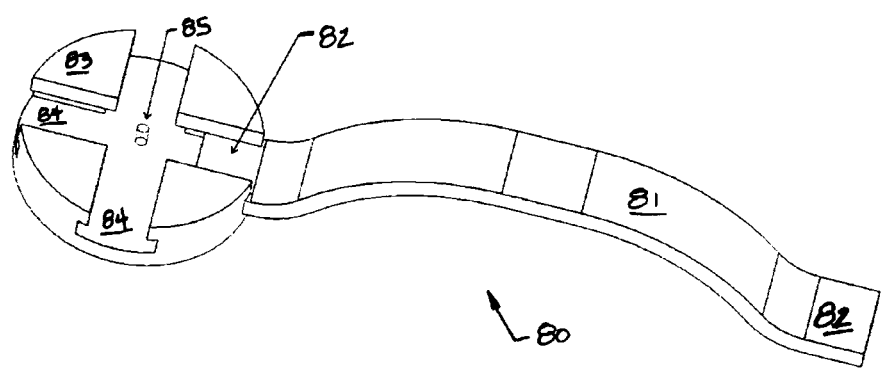
FIG. 8A shows an isometric view of an exemplary multi-notched foot pedestal and single swept-spring, in accordance with some embodiments of the present invention.
Figure 8B:
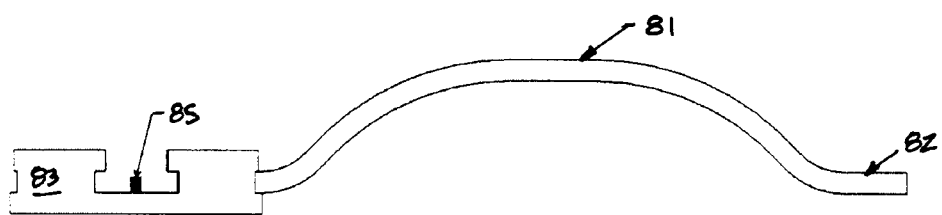
FIG. 8B depicts a side view of an exemplary multi-notched foot pedestal and swept-spring, in accordance with some embodiments of the present invention.

With reference to FIGS. 8A and 8B assembly of a swept spring into a four-way pedestal base can be seen. Swept spring 81 may comprise proximate and distal ends 82 which may be substantially flat. Substantially flat proximate and distal ends 82 may be inserted into slots 84 which may be located in base pedestal 83. Upon application of force to the arch of the swept spring 81, the substantially flat portion 82 may move laterally with in base pedestal 83, thereby contacting or otherwise triggering center sensor 85.

Figure 9A:
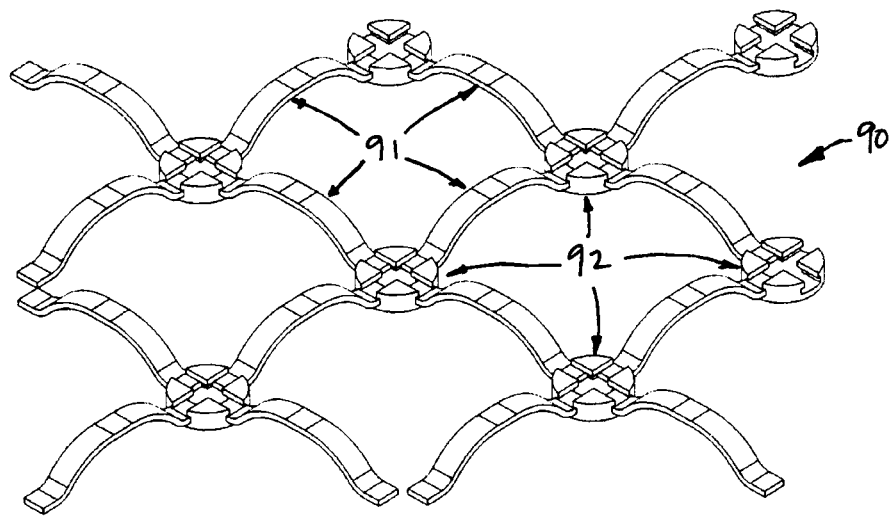
FIG. 9A illustrates an isometric view of a plurality of exemplary multi-notched foot pedestals in a crossed-mesh configuration, in accordance with some embodiments of the present invention.
Figure 9B:
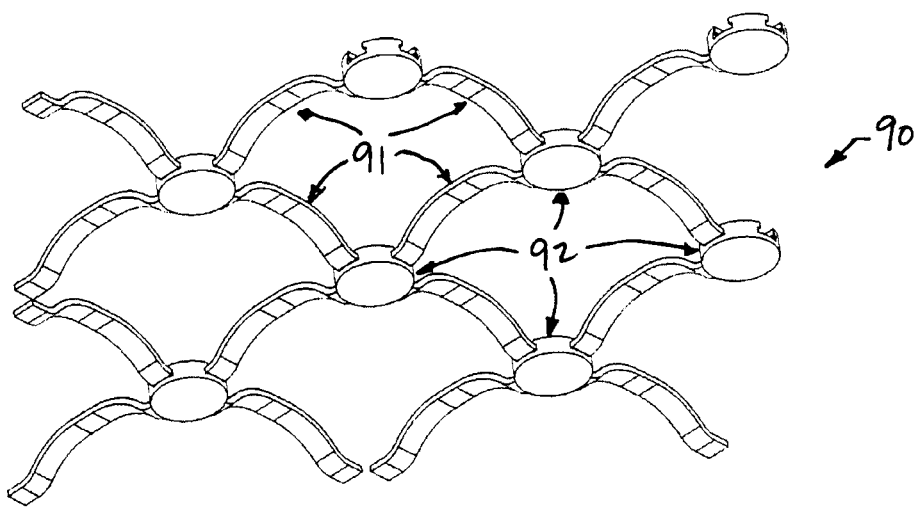
FIG. 9B illustrates an isometric bottom view of a plurality of exemplary multi-notched foot pedestals in a crossed-mesh configuration, in accordance with some embodiments of the present invention.

With reference to FIGS. 9A and 9B it can be seen that swept springs and pedestal bases may be used to create a repeating structure 90. Repeating structure 90 may be comprised of a plurality of a swept springs 91 and a plurality of pedestal bases 92.

Figure 10A:
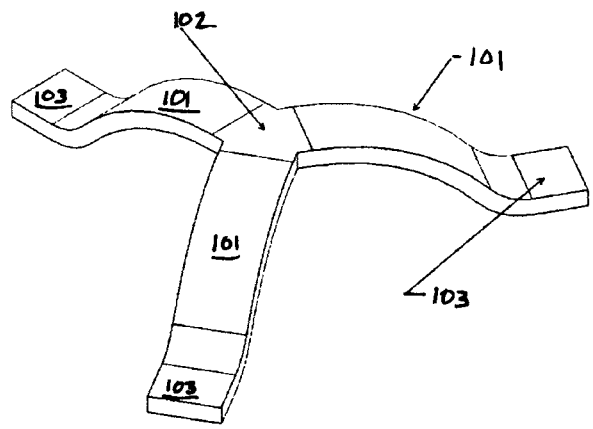
FIG. 10A illustrates an isometric view of an exemplary three pronged swept-spring, in accordance with some embodiments of the present invention.
Figure 10B:
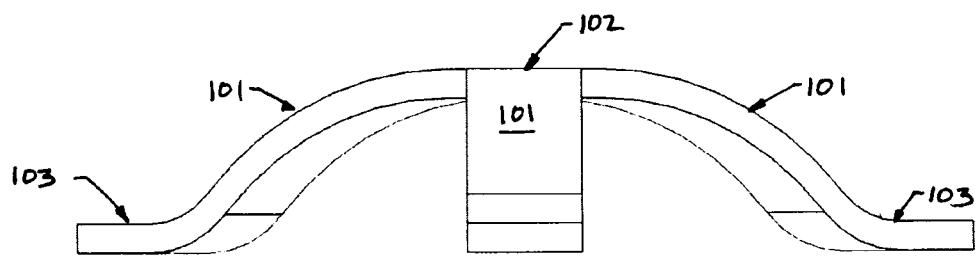
FIG. 10B depicts a side front view of an exemplary three pronged swept-spring, in accordance with some embodiments of the present invention.

It is contemplated that swept springs in accordance with some embodiments of the present invention may take any shape or size. For example, with reference to FIGS. 10A and 10B, a swept spring 100 may include three legs. Slept spring 100 may comprise three legs 101, each connected to a flat center section 102. The distal end of each leg 101 may be formed into a substantially flat section 103 for insertion into a base pedestal.

Figure 11:
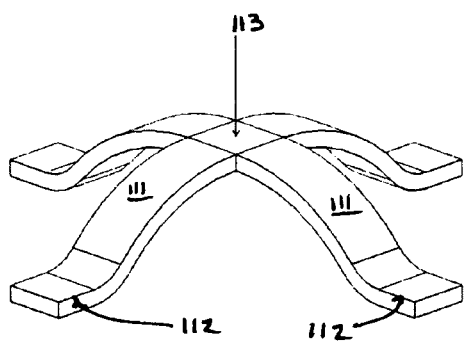
FIG. 11 depicts an isometric view of an exemplary four pronged swept-spring, in accordance with some embodiments of the present invention.

Similarly, with reference to FIG. 11 a swept spring 110 may be formed with four legs. Swept spring 110 may comprise four legs 111 each with a distal substantially flat portion 112 that may be inserted into a base pedestal. Each of four legs 111 may be connected at a substantially flat center portion 113. As noted above, substantially flat center portion 113 may be used to mount various sensors.

Figure 12:
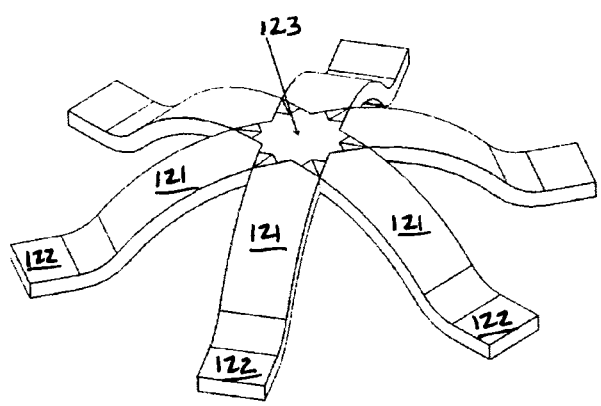
FIG. 12 shows an isometric view of an exemplary six pronged swept-spring, in accordance with some embodiments of the present invention.

With reference to FIG. 12, a swept spring 120 may be formed with six legs. Swept spring 120 may comprise six legs 121 each with a distal substantially flat portion 122. Substantially flat portions 122 may be configured to be inserted into a slot and a base pedestal. Each of legs 121 may meet in the center at a substantially flat portion 123, onto which a sensor may be mounted.

The swept springs as shown in FIGS. 10, 11, and 12, may be utilized with various pedestal bases in order to form repeating structures similar to that shown in FIG. 9. In such arrangements, pedestal bases may be required to have numerous slots in order to receive the various legs of the arch springs. The larger number of legs in a swept spring, the greater the impact force that may be resisted by each spring component. Accordingly, the number of spring legs in an assembly may be selected based upon the specific application, and anticipated amount of force to be received.

Sensors

Note that both the swept spring and the base pedestals may house different types of sensors depending upon specific use scenarios, and the size of sensors. For example, the swept spring arch may contain an accelerometer to allow for the detection of impact force indicating strength and direction, while larger EEG sensors may be positioned within the pedestals. Moreover, in the case of EEG sensors, each base foot pedestal may contain an electrode at its bottom surface to allow the least possible distance between the subject head and the electrode.

It is also contemplated by the present invention that the swept spring and or the pedestal may include a transceiver for delivering signals of impact and impact details (location, amount of force, direction) to a processing and/or recording system.

Unlike the arch spring embodiments discussed above, the swept spring embodiment may be designed for active impacted dissipation in addition to energy harvesting in order to power sensors. A piezoelectric device or a material with piezoelectric properties may be employed in either the swept-spring arch or pedestal. For example, a piezoelectric device may be placed inside the foot pedestal that may generate an electrical pulse. Such electric impulse may be used not only to indicate that an impact force has been received, but also to provide power to various sensors embedded within the assembly.

In the case of active energy dissipation, it is anticipated that the materials from which the swept springs are comprised may have variable mechanical resistive forces. For example, a swept spring may be comprised at least in part of a memory material, which when no electrical current is applied, may have a certain bulk modulus. However, upon application of electric current, the material may seek to return to a specific shape, which may be in direct opposition of the spring shape. Accordingly, through internal tension the effective bulk modulus of the spring may be increased. In this manner, upon receiving first indication of an impact force, surrounding spring elements may be configured to have greater or less resistive forces, in order to receive the initial impact force and spread it amongst a larger region.

Figure 13:
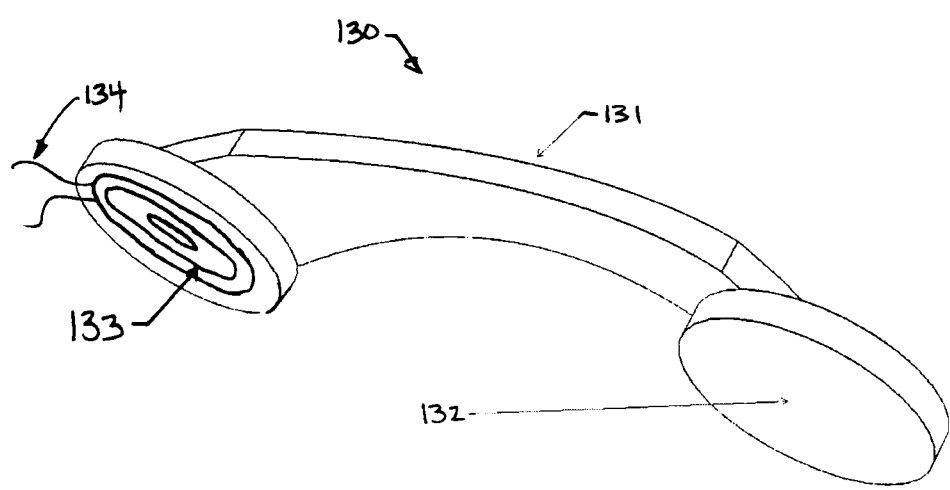
FIG. 13 illustrates an isometric view of an exemplary arch-spring with sensors, in accordance with some embodiments of the present invention.

With reference to FIG. 13, an arch spring 130 may be seen. Arch spring 130 may include an arch 131 and two bases 132. A sensor 133 may be positioned on the bottom of base 132. It is contemplated that sensor 133 may interact with a processor either wirelessly, or through various electrical leads communication wires 134.

Figure 14A:
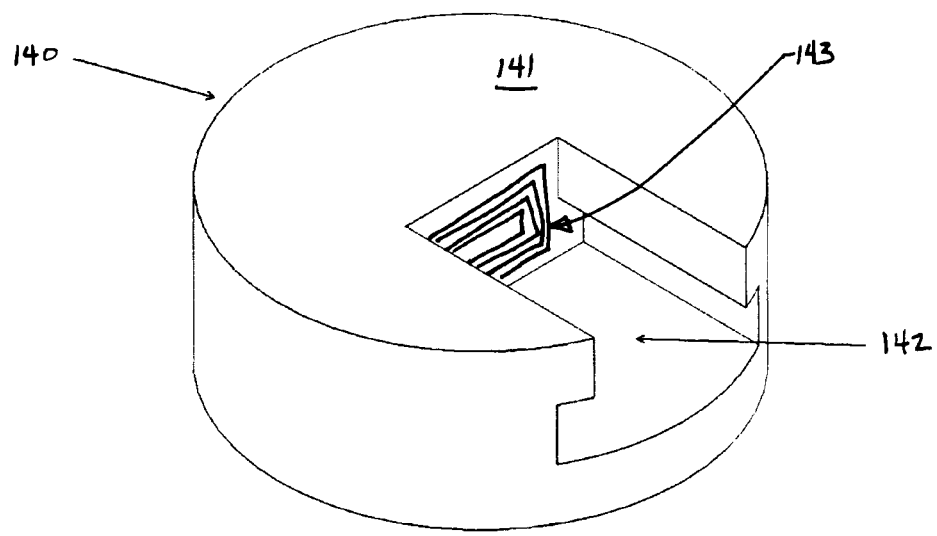
FIG. 14A depicts an isometric view of an exemplary pedestal with sensors attached, in accordance with some embodiments of the present invention.
Figure 14B:
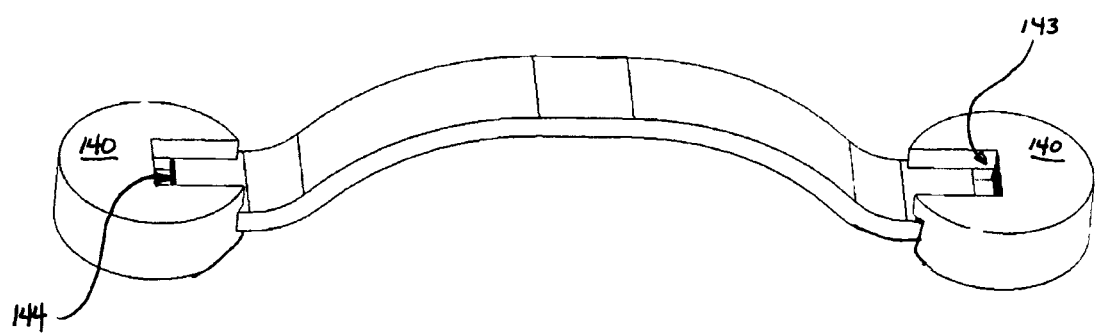
FIG. 14B illustrates an isometric view of an exemplary arch spring and pedestal assembly with sensors attached, in accordance with some embodiments of the present invention.
Figure 15:
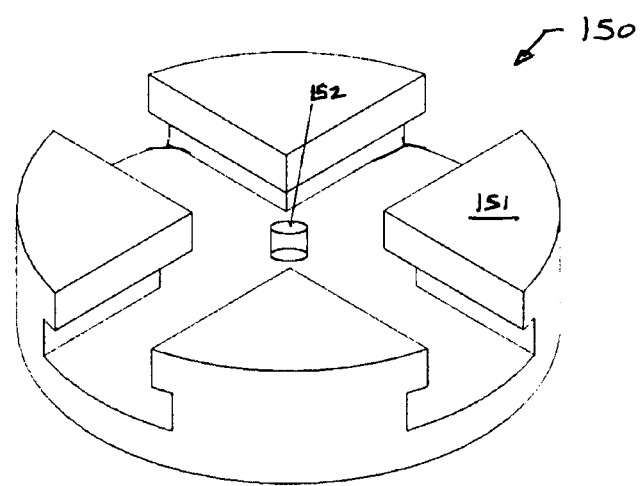
FIG. 15 shows an isometric view of an exemplary pedestal equipped with a sensor, in accordance with some embodiments of the present invention.

With reference to FIGS. 14A and 14B, a sensor 143 may be positioned within a pedestal base 141. Pedestal base 141 may include a slot 142 as discussed above. Sensor 143 may be positioned on pedestal base 141 at the termination of slot 142. In this manner, as can be seen from FIG. 14B, upon lateral movement of a spring with in slot 142, sensor 143 may be triggered. It is also anticipated that a sensor may be positioned on the end of spring 144, as opposed to, or in addition to, sensor 143.

As noted above, a pedestal base may comprise a sensor. In the case of a four way pedestal base 151, a sensor 152 may be centrally located. Such central location may permit a single sensor to determine motion from at least four springs.

Know that while EEG and piezoelectric sensors have been discussed above, it is contemplated that any type of sensor or sensing device may be placed upon springs and/or pedestal bases. Additional types of sensors may include, but are not limited to: vibration seismometers, current sensors, galvanometer, Hall Effect sensors, metal detectors, accelerometers, linear variable differential transformers, piezoelectric accelerometers, position sensors, variable reluctance sensors, force gauge and force sensors, load cells, strain gauges, proximity sensors, and/or touch switches. In addition, it is also contemplated that deflection upon receipt of an impact force may also cause conductive properties of the spring materials to change, and therefore changes in resistive and/or conductive properties of a spring or a spring assembly, may also indicate receipt of force.

Figure 16:
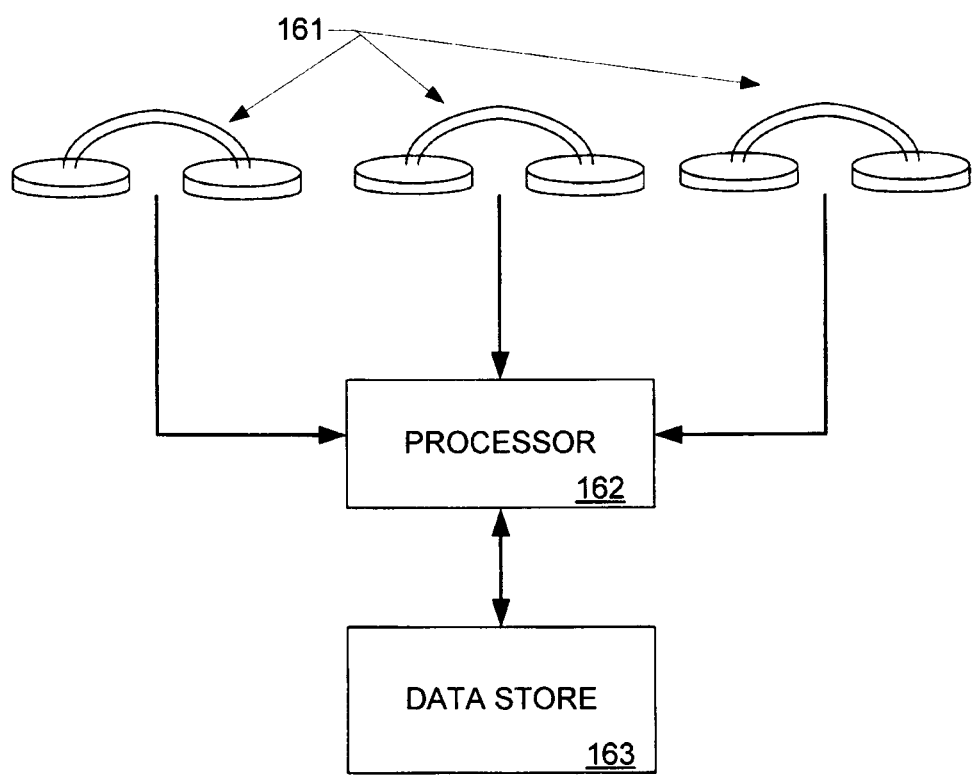
FIG. 16 illustrates an exemplary system of recording impact force, in accordance with some embodiments of the present invention.

With reference to FIG. 16, a general system 160 is depicted. System 160 may be a passive system that may detect, deflect, absorb, and sends impact forces. System 160 may generally comprise one or more spring base assemblies 161 in electrical communication with a processor 162. Processor 162 may include or otherwise be electrical connection with a data store 163. Processor 162 may receive various inputs from sensors positioned within, on, or proximate two, spring base assemblies 161, and may determine the location, severity, and/or direction of impact forces. Upon determination of impact force details, processor 162 may send such information to data store 163 for later use. Data store 163 may comprise any type of memory device including but not limited to a hard drive, nonvolatile RAM, disk drive, flash memory, and/or any other type of memory system.

Figure 17:
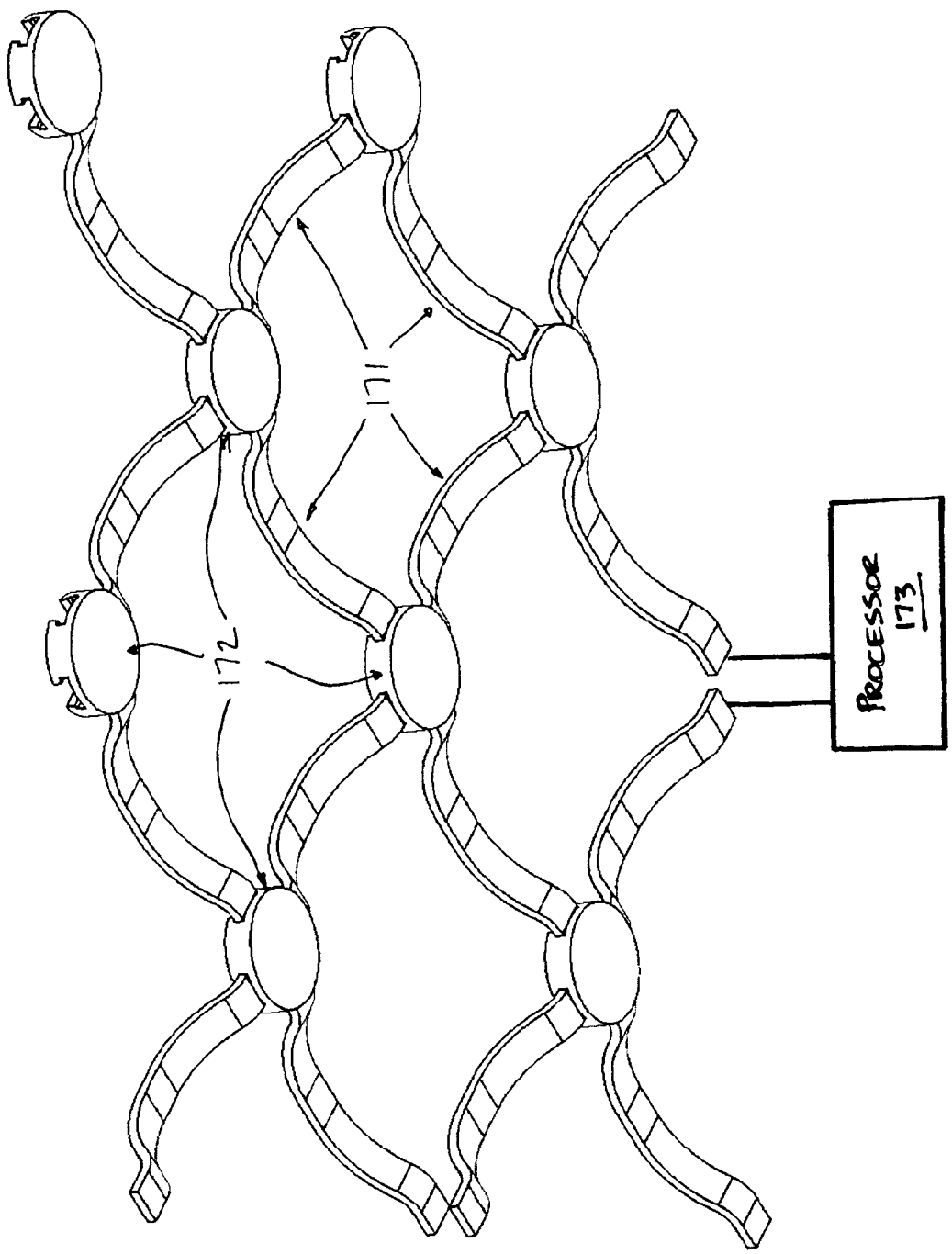
FIG. 17 illustrates an exemplary system of recording impact force, in accordance with some embodiments of the present invention.

With reference to FIG. 17, an exemplary system 170 will now be discussed. Exemplary system 170 may generally comprise a plurality of springs 171 coupled with a plurality of bases 172 accordance with some embodiments of the present invention, springs 171 and bases 172 may also be utilized to transmit sensor readings throughout the network. A processor 173 may be electrically connected to springs 171 at any location. Processor 173 may receive electrical communication throughout the network, based on which processor 173 may determine the location, extent, and direction, of any impact forces.

Figure 18:
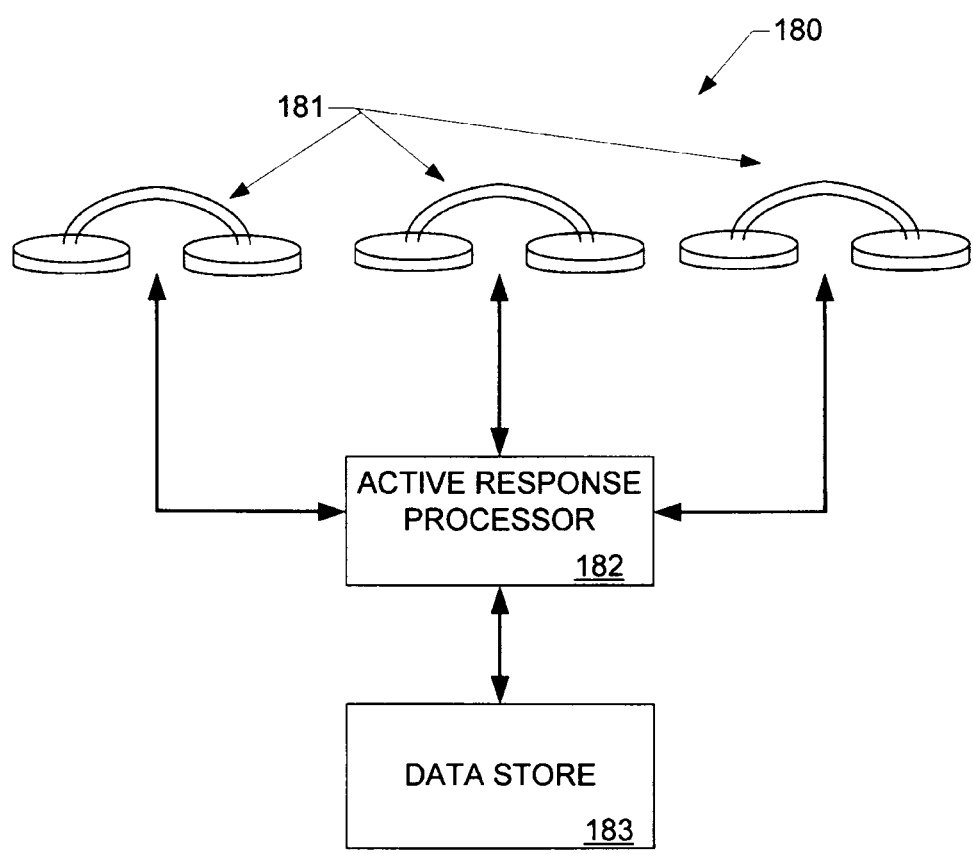
FIG. 18 depicts an exemplary system of recording and actively responding to impact force, in accordance with some embodiments of the present invention.

With reference to FIG. 18, an active response system 180 may be seen. Active response system 180 may comprise a plurality of active spring components 181, electrically connected to a processor 182, which in turn may be connected to a data store 183. As before, data store 183 may be configured to store information related to any forces received by active spring components 181. Processor 182 may receive information from active spring components 181, and upon determination of a location, extent, and direction of force, may provide electrical inputs back to active spring components 181 in real time (or substantially real-time) such that active spring components 181 may work together to resist and otherwise deflect and/or absorb impact force.

Figure 19:
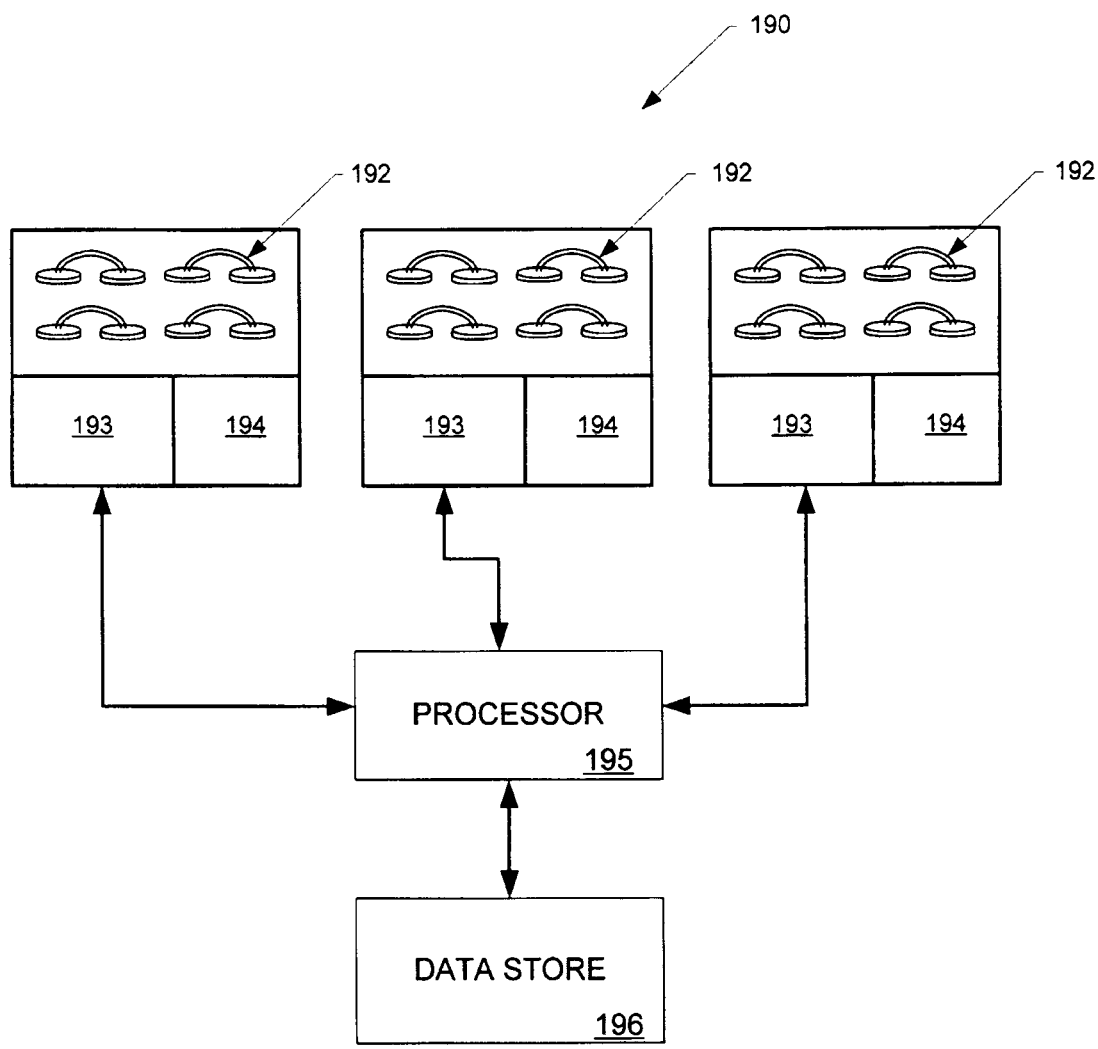
FIG. 19 illustrates an exemplary system of recording an impact at one subsystem and actively responding to multiple subsystems, in accordance with some embodiments of the present invention.

With reference to FIG. 19 system 190 will now be discussed. System 190 may comprise a plurality of subsystems 191. Subsystems 191 may in turn comprise a plurality of active spring components 192, as well as processors 193 and data stores 194. Each of subsystems 191 may communicate with a general processor 195. As before processor 195 may be in communication with the data store 196.

In system 190, it is contemplated that subsystems 191 may be indirect electrical communication with processor 195, or may be in wireless communication with processor 195. Processor 195 may receive inputs from any of subsystems 191, and therefore any constituent spring components 192 of subsystems 191, in may provide active response to any subsystem 191. For example, in the case of body armor, upon receipt of an impact force from any single body armor, active systems within body armors of nearby troops may be activated.

Various materials were discussed above which may have different characteristics under different conditions. For example, arch springs may be made from memory material which in an ambient state may be relatively flexible. Accordingly, clothing, liners, and/or body armor made from such material may be in a flexible and therefore comfortable state until triggered. Once processor 195 receives communication of an impact force on any body armor within the system 190, processor 195 may activate all body armor to be triggered into its protective state. To do so, processor 195 may communicate back to subsystems 191 alerting subsystems 191 to provide the current, or other necessary circumstances to actively respond to force. Note that force may not be received into each small subsystems 191 at this time. However, by activating subsystems 191 in constituent component springs 192, and the later received force may be more effectively deflected, absorbed, and/or dissipated.

In addition to processor 195 triggering active response of subsystems 191 based upon a received impact force, it is also contemplated the processor 195 may instruct subsystems 191 to achieve an active state based upon other criteria. For example, in the case of sporting events, football pads helmets and/or other protective devices may be in an active state until a certain time. In this scenario, as the players approach line into their Crouch, the system may be activated causing the pads, helmets, in other protective devices to be in an active state. Once play has ceased, the system may return the components to an inactive and therefore more comfortable state. In addition to providing for comfort of the players, such periodic activation of the system may also assist in recording active plays only in data store 196, as opposed to recording long periods of inactivity.

Figure 20:
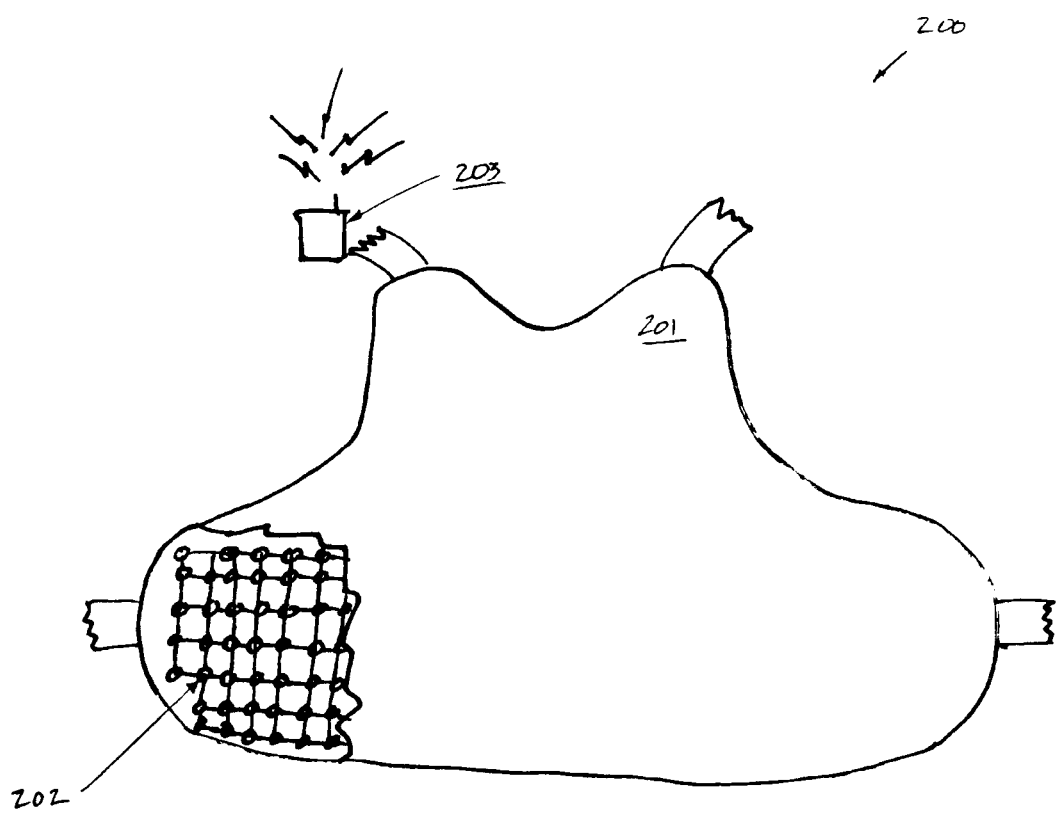
FIG. 20 illustrates an exemplary system of body armor, in accordance with some embodiments of the present invention.
Figure 21:
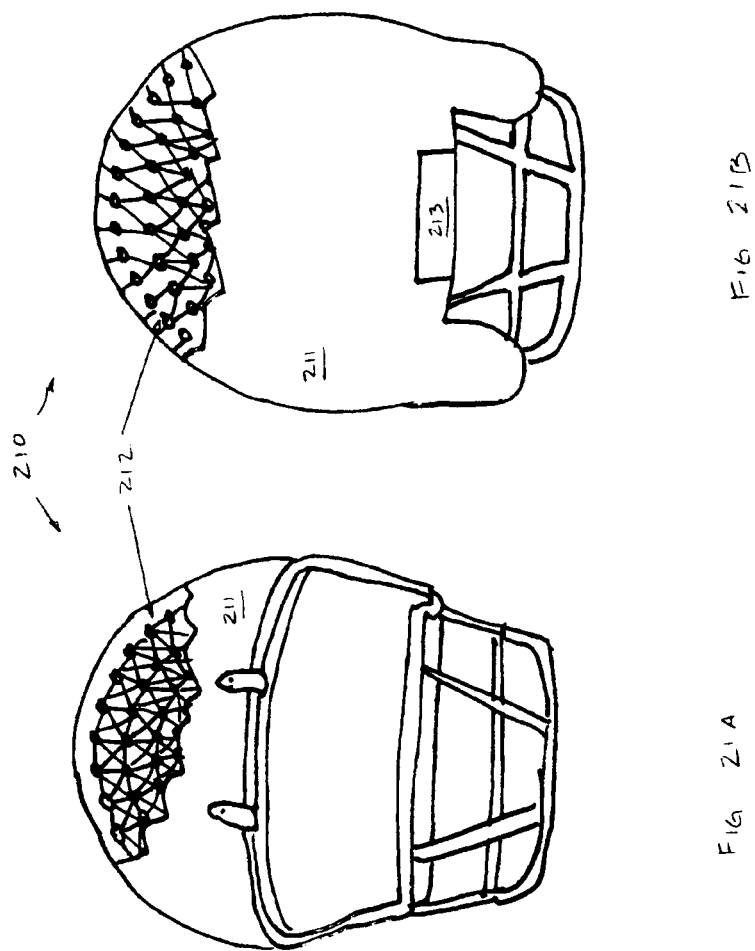
FIGS. 21A-B depicts an exemplary helmet, in accordance with some embodiments of the present invention.
Figure 22:
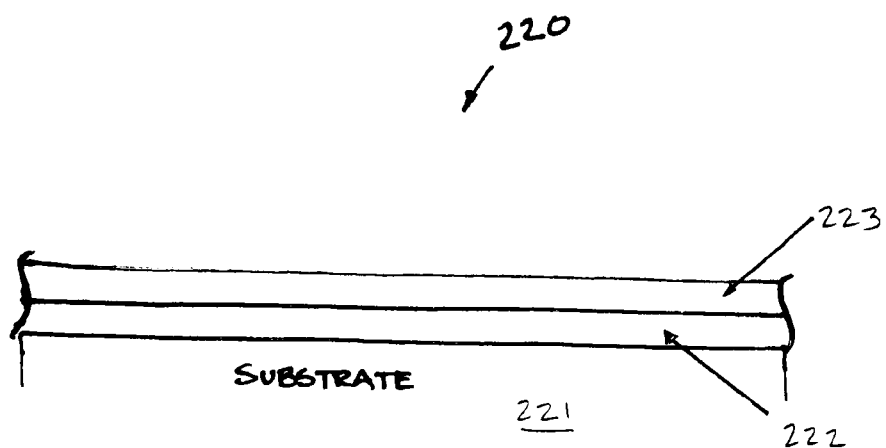
FIG. 22 illustrates an exemplary flooring configuration, in accordance with some embodiments of the present invention.

With reference to FIGS. 20-22, systems in accordance with the present invention may be embedded within various products. With reference to FIG. 20, body armor 200 will be discussed. Body armor 200 may comprise a general chest section 201 that may be worn by a user. Inside chest section 201, a chain mail of spring devices and base pedestals may be disposed. In addition, a processing unit and/or communication unit 203 may be positioned in a nonessential portion of the body armor 200. Processing unit and/or communication unit 203 may be utilized to communicate with a processor in order to both record of events, and in the case of an active system, cause other associated body armor to respond.

With reference to FIGS. 21A and 21B a football helmet 210 may be seen. Helmet 210 may include under a shell 211 a network of spring devices and base pedestals. In addition, helmet 210 may further comprise unit 213, which may record, process, or actively respond to force impacts received.

With reference to FIG. 22, a flooring system 220 may be seen. Flooring system 220 may comprise a substrate 221 and a flooring surface 223. Same as between substrate 221 and flooring surface 223 may be a layer comprising a network of spring devices and pedestals. In this manner, impact on flooring system 220 may be deflected, absorbed, sensed, and recorded.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. An impact absorption and detection system, comprising:
   a plurality of arch spring assemblies, comprising:
      a deflectable arch spring having at least one leg with proximal and distal ends;
      one or more bases, each of the proximal and distal ends attached to a base;
      at least one sensor attached to the arch spring assembly;
   wherein the plurality of arch spring assemblies is configured in a chainmail arrangement, wherein a base of one arch spring assembly is connected with a base of another arch spring assembly;
   a processor, the processor electrically connected to the sensors attached to the plurality of arch spring assemblies; and
   a data store, in communication with the processor.

2. The impact absorption and detection system of claim 1, wherein each of the proximal and distal ends and the bases are integrally formed from a single material.

3. The impact absorption and detection system of claim 1, wherein the base comprises one or more channels keyed to fit a cross-section of the proximal or distal ends, and wherein the proximal and distal ends are attached to the base through a mechanical connection.

4. The impact absorption and detection system of claim 1, wherein the at least one sensor comprises a sensor mounted on each base.

5. The impact absorption and detection system of claim 1, wherein the processor is configured to receive inputs from the one or more sensors indicating when an impact force has been received.

6. The impact absorption and detection system of claim 5, wherein the processor is configured to determine, based upon the inputs received from the one or more sensors, the amount, location, and direction of force received.

7. The impact absorption and detection system of claim 1, the system being disposed within a piece of body armor, helmet, or flooring.

8. An impact absorption and detection system disposed in a piece of body armor, comprising:
   a plurality of arch spring assemblies, comprising:
      a deflectable arch spring having at least one leg with proximal and distal ends;
      one or more bases, each of the proximal and distal ends attached to a base;
      at least one sensor attached to the base;
   wherein the plurality of arch spring assemblies is configured in a chainmail arrangement, wherein a base of one arch spring assembly is connected with a base of another arch spring assembly;
   a processor, the processor electrically connected to the sensors attached to the plurality of arch spring assemblies and configured to receive inputs from the one or more sensors indicating when an impact force has been received and determine, based on such inputs, the amount, location, and direction of force received; and
   a data store, in communication with the processor.

* * * * *